United States Patent
Young et al.

(10) Patent No.: US 10,627,250 B2
(45) Date of Patent: Apr. 21, 2020

(54) SYSTEM AND METHOD FOR TRACKING VEHICLE MILEAGE USING BLOCKCHAIN

(71) Applicant: Walmart Apollo, LLC, Bentonville, AR (US)

(72) Inventors: Daniel W. Young, Rogers, AR (US); Vinay Rao, Bentonville, AR (US); Dhivya Ganesan, Rogers, AR (US); Jennifer Northrup, Eureka Springs, AR (US); Richard C. Mcsorley, Bentonville, AR (US); Christopher R. Heeney, Bella Vista, AR (US); Steven Lewis, Bentonville, AR (US); Joseph Jurich, Molino, FL (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/255,160

(22) Filed: Jan. 23, 2019

(65) Prior Publication Data
US 2019/0226850 A1    Jul. 25, 2019

Related U.S. Application Data

(60) Provisional application No. 62/621,726, filed on Jan. 25, 2018.

(51) Int. Cl.
*G01C 21/34* (2006.01)
*G01C 21/20* (2006.01)
(Continued)

(52) U.S. Cl.
CPC ......... *G01C 21/3484* (2013.01); *G01C 21/20* (2013.01); *G06F 16/27* (2019.01);
(Continued)

(58) Field of Classification Search
CPC .. G01C 21/3484; G01C 21/20; G07C 5/0808; G07C 5/02; G06F 16/27
See application file for complete search history.

(56) References Cited

U.S. PATENT DOCUMENTS 6,591,188 B1 *   7/2003  Ohler ................. G01C 21/3484
                                                            701/423
9,715,546 B1 *   7/2017  Mohassel et al. .... G06F 16/325
(Continued)

OTHER PUBLICATIONS

International Search Report and Written Opinion dated Apr. 2, 2019, issued in corresponding PCT Application No. PCT/US2019/014743.

(Continued)

*Primary Examiner* — Dale W Hilgendorf
(74) *Attorney, Agent, or Firm* — Venable LLP; Jeffri A. Kaminski

(57) ABSTRACT

Systems, methods, and computer-readable storage media for identifying, via a processor, a plurality of causes for a vehicle to record data on a blockchain, wherein one cause in the plurality of causes is a repetition of a previous journey. The system generates route comparison data by comparing, via a processor as the vehicle is moving, current journey data for a current journey to previous journey data of at least one previous journey by: comparing a current journey start time to a previous journey start time; comparing a current journey travel time to a previous journey travel time; and comparing current journey route coordinates to previous journey route coordinates. Then based on the route comparison data, the system generates a side block which references the previous block in the block chain but contains only distinctions from the previous block. The side block is then added to the block chain.

20 Claims, 5 Drawing Sheets

(51) Int. Cl.
    *G06F 16/27*     (2019.01)
    *G07C 5/02*     (2006.01)
    *G07C 5/08*     (2006.01)

(52) U.S. Cl.
    CPC ............ *G07C 5/02* (2013.01); *G07C 5/0808* (2013.01); *G07C 5/0841* (2013.01)

(56) References Cited

U.S. PATENT DOCUMENTS

| | | | | |
|---|---|---|---|---|
| 10,158,492 | B2* | 12/2018 | Pearce | ................. G01S 19/215 |
| 2008/0195313 | A1* | 8/2008 | Coleman | ............ G01C 21/3484 701/414 |
| 2009/0326798 | A1* | 12/2009 | Insolia et al. | ...... G01C 21/3484 701/533 |
| 2011/0178698 | A1 | 7/2011 | Aben et al. | |
| 2015/0262433 | A1 | 9/2015 | Davidson | |
| 2016/0368495 | A1 | 12/2016 | Luther et al. | |
| 2017/0046652 | A1 | 2/2017 | Haldenby et al. | |
| 2017/0054611 | A1 | 2/2017 | Tiell | |
| 2017/0138747 | A1 | 5/2017 | Brito et al. | |
| 2017/0314944 | A1* | 11/2017 | Konig et al. | ....... G01C 21/3484 |
| 2018/0211213 | A1* | 7/2018 | Viver | ................. G06Q 10/0832 |
| 2018/0374283 | A1 | 12/2018 | Pickover et al. | |

OTHER PUBLICATIONS

Jim Manning, "Bosch Using Blockchain Technology to Stop Illegal Mileage Manipulation", ETHNews.com, Mar. 24, 2017, pp. 1-6.
Luis Meijueiro, "Blockchain: new technologies to eliminate fraud", CTIC Foundation, Apr. 17, 2017, pp. 1-4.
Mathieu Chanson et al., "Blockchain as a Privacy Enabler: An Odometer Fraud Prevention System", UBICOMP/ISWC 17 Adjunct, Sep. 11-15, 2017, pp. 13-16.
Faizod, "No More Odometer Manipulation—Thanks to Block Chains", 2016, pp. 1-5.
Cryptoland PR, "VeChain to Use Blockchain to Put an End to Car Clocking", Coinspeaker.com, Aug. 14, 2017, pp. 1-3.
Jonathan Keane, "Trust Your Odometer?Blockchain Test Aims to Turn Tide on Car Tampering", coindesk.com, Jul. 21, 2017, pp. 1-4.

* cited by examiner

SYSTEM AND METHOD FOR TRACKING VEHICLE MILEAGE USING BLOCKCHAIN

PRIORITY

The present application claims priority to U.S. Provisional Patent Application No. 62/621,726, filed on Jan. 25, 2018, the contents of which are incorporated herein in their entirety.

BACKGROUND

1. Technical Field

The present disclosure relates to vehicles and blockchains, and more specifically to new blockchain storage techniques used for the practical application of recording vehicle information.

2. Introduction

Vehicle data is traditionally stored on the vehicle, then manually transferred to computers, networks, or other mechanisms where the data can be analyzed and compared. However, such traditional vehicle data systems create problems in protecting the integrity of the data during (1) the transfer process and (2) post transfer. For example, when performed by humans, such systems of transferring data from vehicles to cars can result in natural errors from the data transfer process. More recently, data loggers (such as those that connect to a steering column on a car) have removed human error, but introduce the possibilities of hacked data, or data that has been manipulated by others. Post transfer of the data, the data can be stored in a database (SQL (Structured Query Language) or otherwise), where the data is again subject to corruption or unauthorized manipulation. Therefore, an exemplary technical problem which exists based on current solutions is data corruption and unauthorized data manipulation.

SUMMARY

An exemplary method of performing concepts disclosed herein can include: identifying, via a processor, a plurality of causes for a vehicle to record data on a blockchain, wherein one cause in the plurality of causes is a repetition of a previous journey; generating route comparison data by comparing, via a processor as the vehicle is moving, current journey data for a current journey to previous journey data of at least one previous journey by: comparing a current journey start time to a previous journey start time; comparing a current journey travel time to a previous journey travel time; and comparing current journey route coordinates to previous journey route coordinates; identifying, via the processor based on the route comparison data, that the vehicle is performing a current journey which is a repeat of the previous journey, wherein statistics associated with the previous journey were previously recorded in a blockchain; identifying a previous block within the blockchain which contains the statistics for the previous journey; generating, via the processor a side block, the side block having a data structure compatible with addition to the blockchain, the side block comprising: (1) a reference to the previous block; and (2) data about the current journey which is distinct from the previous journey; and adding the side block to the blockchain.

An exemplary system configured according to the concepts and principles disclosed herein can include: a processor; and a computer-readable storage medium having instructions stored which, when executed by the processor, cause the processor to perform operations comprising: identifying a plurality of causes for a vehicle to record data on a blockchain, wherein one cause in the plurality of causes is a repetition of a previous journey; generating route comparison data by comparing, as the vehicle is moving, current journey data for a current journey to previous journey data of at least one previous journey by: comparing a current journey start time to a previous journey start time; comparing a current journey travel time to a previous journey travel time; and comparing current journey route coordinates to previous journey route coordinates; identifying, based on the route comparison data, that the vehicle is performing a current journey which is a repeat of the previous journey, wherein statistics associated with the previous journey were previously recorded in a blockchain; identifying a previous block within the blockchain which contains the statistics for the previous journey; generating a side block, the side block having a data structure compatible with addition to the blockchain, the side block comprising: (1) a reference to the previous block; and (2) data about the current journey which is distinct from the previous journey; and adding the side block to the blockchain.

An exemplary non-transitory computer-readable storage medium configured as disclosed herein can have instructions stored which, when executed by a computing device, cause the computing device to perform operations including: identifying a plurality of causes for a vehicle to record data on a blockchain, wherein one cause in the plurality of causes is a repetition of a previous journey; generating route comparison data by comparing, as the vehicle is moving, current journey data for a current journey to previous journey data of at least one previous journey by: comparing a current journey start time to a previous journey start time; comparing a current journey travel time to a previous journey travel time; and comparing current journey route coordinates to previous journey route coordinates; identifying, based on the route comparison data, that the vehicle is performing a current journey which is a repeat of the previous journey, wherein statistics associated with the previous journey were previously recorded in a blockchain; identifying a previous block within the blockchain which contains the statistics for the previous journey; generating a side block, the side block having a data structure compatible with addition to the blockchain, the side block comprising: (1) a reference to the previous block; and (2) data about the current journey which is distinct from the previous journey; and adding the side block to the blockchain.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Figure 1:
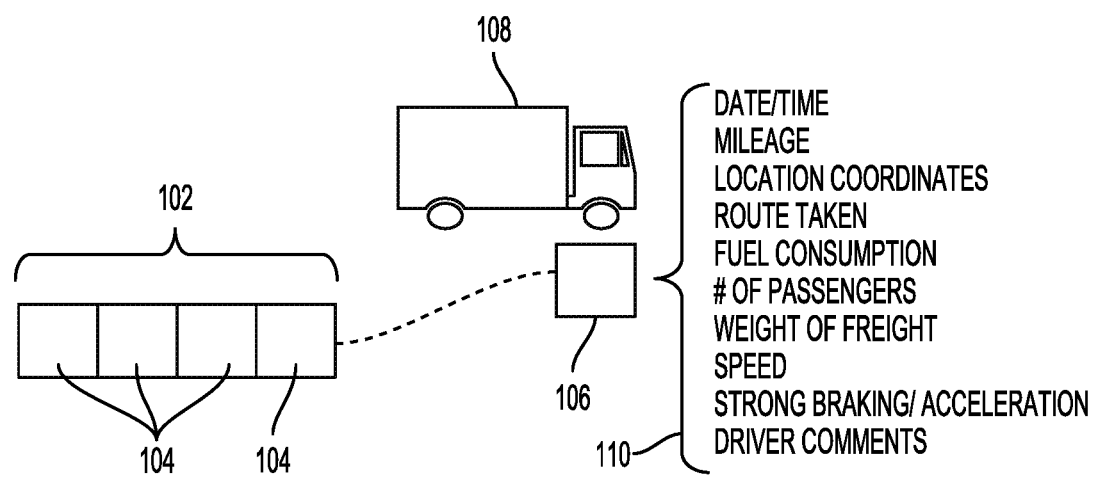
FIG. 1 illustrates an example blockchain recordation system for vehicles.

Various embodiments of the disclosure are described in detail below. While specific implementations are described, it should be understood that this is done for illustration purposes only. Other components and configurations may be used without parting from the spirit and scope of the disclosure.

Blockchains, such as those used in Bitcoin, ETHEREUM, and other crypto-currencies, rely on decentralized verification systems across a network. In the case of a crypto-currency, transaction verification can be decentralized, allowing the transaction to be independently verified by multiple entities. This decentralization can allow for increased trust in the transaction's veracity, reduce the likelihood of a single point of failure, reduce censorship or prohibition against certain types of transactions, and be more open to innovation than many previous currencies or other transaction systems.

In addition to the security provided by decentralization, the transactions are encrypted and/or hashed. In the case of encryption, this allows a user or other entity to unlock or decrypt information which was previously encrypted. In the case of a hash function (which is a one-way function), one cannot derive the original data from the hash output, only prove that it existed. Whereas encrypted data uses a key to unlock or decrypt the data, a hash function does not use a key. Instead, the hash function always produces the same output from the same data, such that if any aspect of the data is modified, the resulting hash no longer matches.

For storing information related to vehicles, such as mileage, location, route taken, fuel consumption, number of passengers, weight of freight, speed, braking conditions, accelerations, date/time of travel, etc., storage in a standard database can be, in some circumstances, non-optimal. Specifically, classic storage systems (1) may allow for modification, alteration, or other manipulation of the data being stored, and/or (2) may not inform others that the data has been modified or manipulated.

One exemplary, non-limiting, practical application to the technical problem of data corruption and unauthorized data manipulation is the use of a blockchain system, and the systems configured as disclosed herein improve blockchain systems for recording vehicle data such that modification of the data is inhibited after the data has been added to the blockchain. In addition, the blockchains used by systems as disclosed herein are self-referencing blockchains, with the capacity to refer to previous blocks. A referencing block (one referring back to a block already on the blockchain) being generated for addition to the blockchain can include, for example: an identification of the previous block being referenced; and any differences, deltas, or modifications in current data versus the data stored in the previous data. If additional reference block are being added (i.e., after a first reference block has been added), that additional reference block can refer either to the original block or the reference block.

The reference block can, for example, be a "side block" or a "mini block." A side block is not added to the end of the blockchain as a new block is conventionally, but is instead added to the side of the blockchain next to the block already in the blockchain being referenced. That is, the most recent "full" block added to the blockchain is not referenced by the side block being added, and the side block being added only references the previously added block block. Likewise the most recently added full block does not reference the side block being added. A mini block can be added to the end of the blockchain as a new block, but one which refers back to a previous block. Both mini blocks and side blocks can be distinct from full or normal blocks in terms of the memory required to store the data being added, the reference to previous blocks, and/or the location coordinates where the reference block is stored.

For example, regarding the location coordinates, within the blockchain the blocks added to the blockchain can be identified by a numerical identification, such as [0001], [0002], etc. A mini block added to the block chain can continue this numbering system, despite containing less data or abbreviated data. By contrast, a side block could be numbered [0002][A], [0005][0025], [0100][A6], or any other numbering system where the original block is referenced with the number of the side block.

In some configurations, adding a block (a full block or a reference block) to the blockchain can occur at fixed, periodic intervals. For example, the system could be configured to add a new block to the blockchain every day at 5 am. This regular, periodic block could record the time, date, and GPS (Global Positioning System) location coordinates of the vehicle at the recorded time. In addition, to such periodic additions, the system can be configured to add blocks to the blockchain when specific conditions ("triggers") are met.

For example, the system may be configured to add a block every time the vehicle begins and ends moving, every time the vehicle travels a certain distance, or every time the vehicle consumes a certain amount of fuel. In addition, the system can be configured to compare the current block being added to previously added blocks. If the block being generated is identical to a previous block already in the blockchain, or within a threshold range of similarity to a previous block (i.e., the same route is being travelled, but at a different time), the system can identify that similarity and, instead of adding the identical or nearly identical block to the blockchain, generate a reference block. The reference block references the previous block where the same (or substantially similar) information was previous recorded, noting any differences between the information stored in the original block and the new information stored in the reference block. Such reference blocks can reduce the overhead requirements for storing information associated with each trip the vehicle makes and also make it more efficient in accessing stored data.

FIG. 1 illustrates an example blockchain recordation system for vehicles. In this example, a network, storage system or memory device contains a blockchain 102. The blockchain 102 can be specific to an individual vehicle, or can be used to store data from multiple vehicles. The blockchain 102 is made up of individual blocks 104 of data, each of which contains information about a vehicle, such as the location of the vehicle, the route the vehicle was travelling, etc., when the block 104 was added.

In this example, a truck 108 is the vehicle, however other exemplary vehicles which can deploy the concepts disclosed herein include automobiles, motorcycles, planes, drones, boats, etc. The blockchain 102 can be stored in memory on the vehicle as the vehicle is travelling, then uploaded to a system for independent analysis when the vehicle connects to a network, or can be broadcast to the system while the vehicle is travelling through wireless (RF, satellite, WiFi, etc.) connections. As the vehicle 108 travels, certain conditions may be met which cause a new block 106 to be generated. This new block can contain information such as (but not limited to): date/time, mileage, location coordinates, route taken, fuel consumption, number of passengers, weight of the freight (or passengers), speed, strong braking/acceleration, and any driver comments. This data 110 is stored in the new block 106, which is then added to the pre-existing blockchain 102 as a new block. In instances where the data being added in the new block 106 is within a threshold similarity to a previous block, the new block 106 can be added to the blockchain 102 as a reference block.

Figure 2:
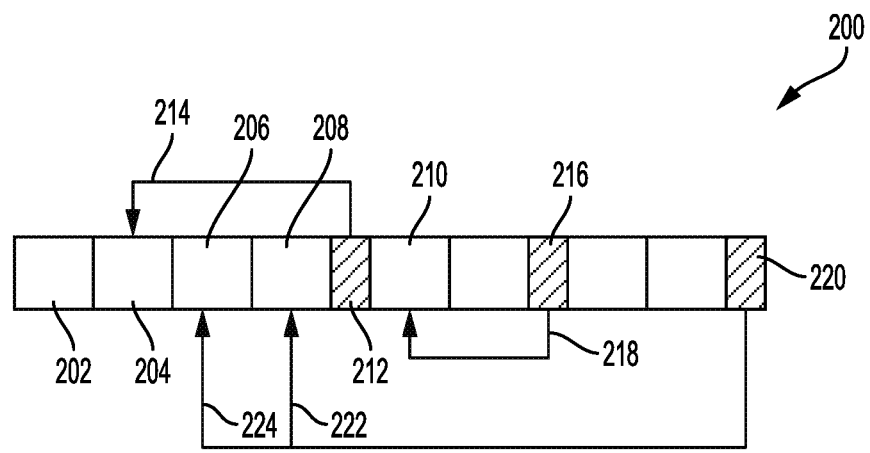
FIG. 2 illustrates a self-referencing blockchain system.

FIG. 2 illustrates a self-referencing blockchain system 200. In this example, the blockchain 200 contains many "full blocks" 202, 204, 206, 208, 210, as well as some "mini blocks" 212, 216, 220. The mini blocks 212, 216, 220 each refer back to one or more previous blocks, and in some cases may contain only the points of distinction from the previously referenced block.

For example, mini block 212 contains a reference 214 to a previous block 204, and mini block 216 contains a reference 218 to a previous block 210. Mini block 220 contains two separate references 222, 224, which could imply that the vehicle repeated the combined actions of both blocks 206 and 208. This illustrates that the system analyzing the data can compare the current travel information to one or more of the blocks already in the blockchain 200 and, when a match to multiple previous blocks is found, can generate a reference block which references more than a single previous block.

To perform the comparison, the system compares the data onboard the vehicle to the data stored in the previous blocks. For each type of data being stored (location, speed, time, etc.), the system can establish a threshold range to determine if new data is close enough that a reference block should be used or if a new, full block should be used. If a sufficient number of data points are within the thresholds established, the system can generate the reference block. In some configurations, the comparison process can occur constantly as the vehicle is travelling (i.e., the system is looking for matches to previous blocks as the vehicle is travelling), whereas in other configurations the comparison process only occurs once a trigger has been met.

Figure 3:
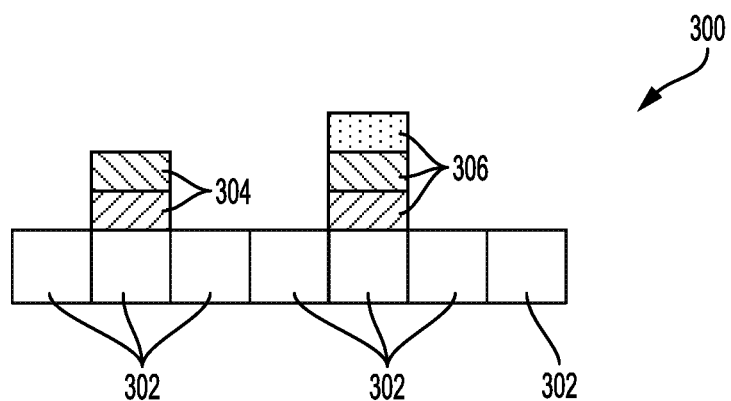
FIG. 3 illustrates a side-chain blockchain system.

FIG. 3 illustrates a side-chain blockchain system. In this configuration, the blockchain 300 has "full" blocks 302 which have been previously added, and reference blocks 304, 306 which are added to the sides of the blockchain 302. As more than one reference block 304 is added to a respective block 302, the reference blocks 304, 306 can "stack," such that they continue to reference the original "full block" 302 and/or the other reference blocks 304, 306 associated with the respective block 302. This arrangement of the date structure allows the system to more efficiently determine and retrieve the data in the chain, providing more efficient operation.

Figure 4:
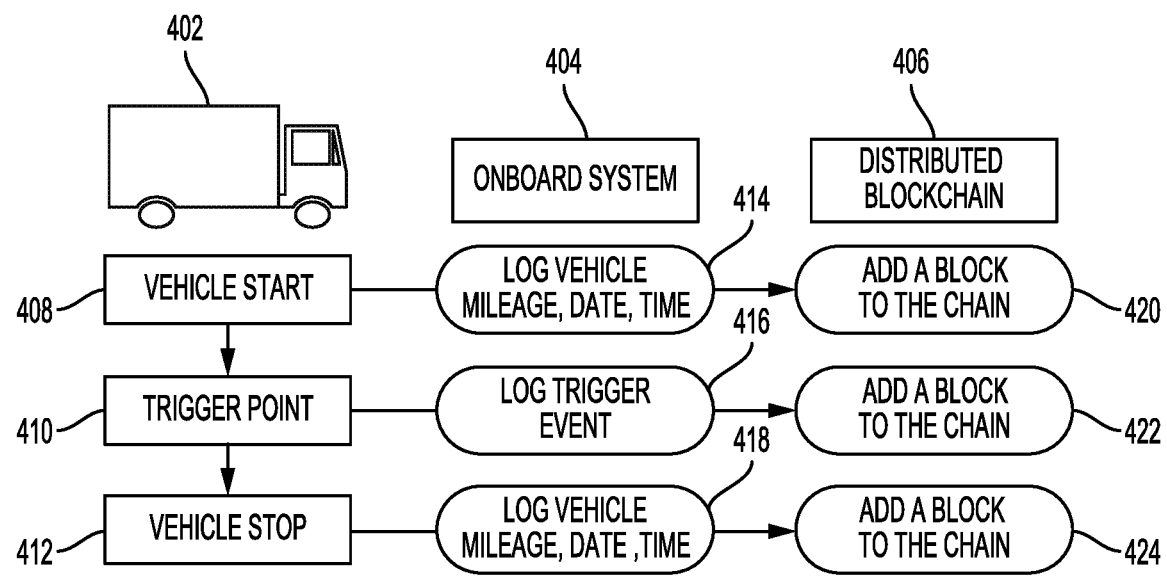
FIG. 4 illustrates addition of blocks to a blockchain based on specific triggers being met.

FIG. 4 illustrates addition of blocks to a blockchain based on specific triggers being met. In this example, a vehicle 402 contains an onboard system 404 which records travel data, such as mileage, fuel consumption, etc., and is in communication with a distributed blockchain 406. The distributed blockchain 406 can be stored, for example, on multiple vehicles, each vehicle adding to the overall blockchain 406 when their respective triggers are met. Such a configuration can be useful when seeking to analyze vehicle fleet data while simultaneously maintaining data integrity in circumstances where data integrity might otherwise be compromised. Alternatively, the blockchain 406 can be stored on across a network on multiple servers.

As triggers are met, blocks are generated and added to the blockchain 406. For example, as a vehicle starts 408, the onboard system can log the vehicle mileage, the date, and the time 414. At that point (or at a later point), the onboard system 404 can generate a block containing this start information 414 and add a block containing that information to the blockchain 420. As the vehicle 402 is travelling, the vehicle can reach a trigger point 410, at which point the onboard system 404 can log the trigger event 412, 416 and any other vehicle data associated with the event 418, then add that information to the blockchain as a block 422, 424. Exemplary trigger events can include an amount of fuel being consumed; mileage being driven; a weight added to the bed of a truck; passing by a tollbooth, scale, or other landmark; a certain time of day; heavy braking; an unexpected stop 412; taking on a new job (particularly for taxi's or transportation services like Uber™), etc. As the onboard system 404 compares the data recorded to blocks previously added to the blockchain 406, the blocks added to the block chain 420, 422, 424 may be reference blocks, rather than full or completely new blocks.

Figure 5:
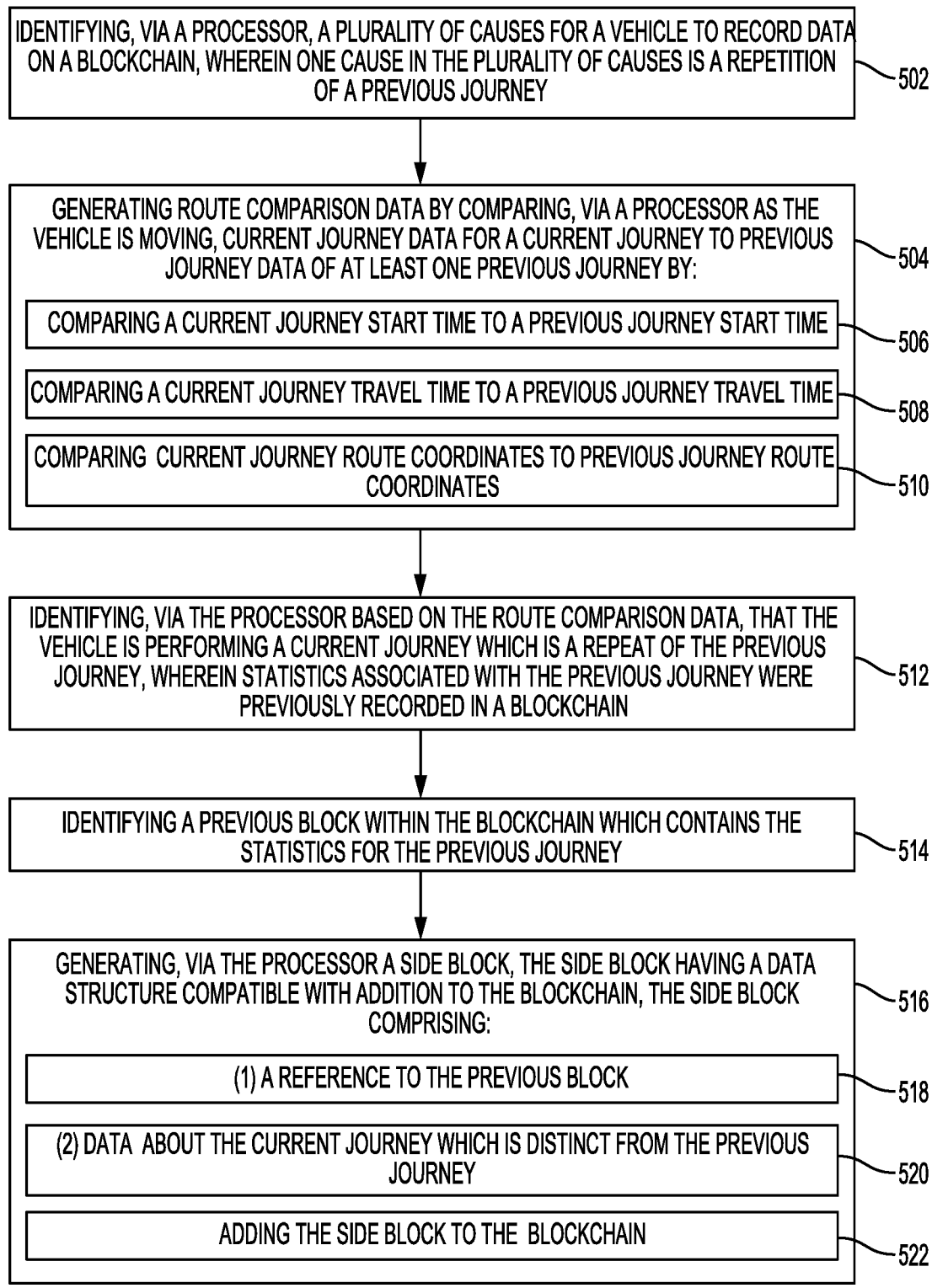
FIG. 5 illustrates an example method embodiment.

FIG. 5 illustrates an example method embodiment. The steps outlined herein are exemplary and can be implemented in any combination thereof, including combinations that exclude, add, or modify certain steps.

The system identifies, via a processor, a plurality of causes for a vehicle to record data on a blockchain, wherein one cause in the plurality of causes is a repetition of a previous journey (502). The system then generates route comparison data by comparing, via a processor as the vehicle is moving, current journey data for a current journey to previous journey data of at least one previous journey by (504): comparing a current journey start time to a previous journey start time (506); comparing a current journey travel time to a previous journey travel time (508); and comparing current journey route coordinates to previous journey route coordinates (510).

The system identifies, via the processor based on the route comparison data, that the vehicle is performing a current journey which is a repeat of the previous journey, wherein statistics associated with the previous journey were previously recorded in a blockchain (512) and identifies a previous block within the blockchain which contains the statistics for the previous journey (514). The system generates, via the processor, a side block, the side block having a data structure compatible with addition to the blockchain, the side block comprising (516): (1) a reference to the previous block (518); and (2) data about the current journey which is distinct from the previous journey (520). The side block is then added to the blockchain (522).

In some configurations, the previous block referenced by the side block, or the side block itself, can include data such as (3) a drive time for the previous journey; (4) fuel consumption for the previous journey; (5) weight of freight carried on the previous journey; and (6) at least one of acceleration and deceleration data. The side blocks and reference block data structures allow the system to quickly perform the comparisons, providing more accurate near-real time data and a more efficient system.

In some configurations, adding the side block to the blockchain is part of a distributed verification process. In some configurations, the side block is added to the blockchain upon completion of the current journey.

In some configurations, the blocks added to the block chain can come from non-vehicles, such as blocks added at a warehouse where freight is added to a vehicle, blocks generated and added by a weigh station or a weigh station scale, blocks added by a central computer performing analysis on the data, etc.

In some configurations, the method can further include adding, to the blockchain, vehicle data, the vehicle data including at least one of fluid levels, engine data, tire mileage, total mileage of the vehicle, and time since wiper replacement. In addition, the method can further include identifying, via a processor, a plurality of times to record the data on the blockchain, the plurality of times corresponding to the plurality of causes such that for each cause a corresponding time in the plurality of times indicates when to record the data on the blockchain.

Figure 6:
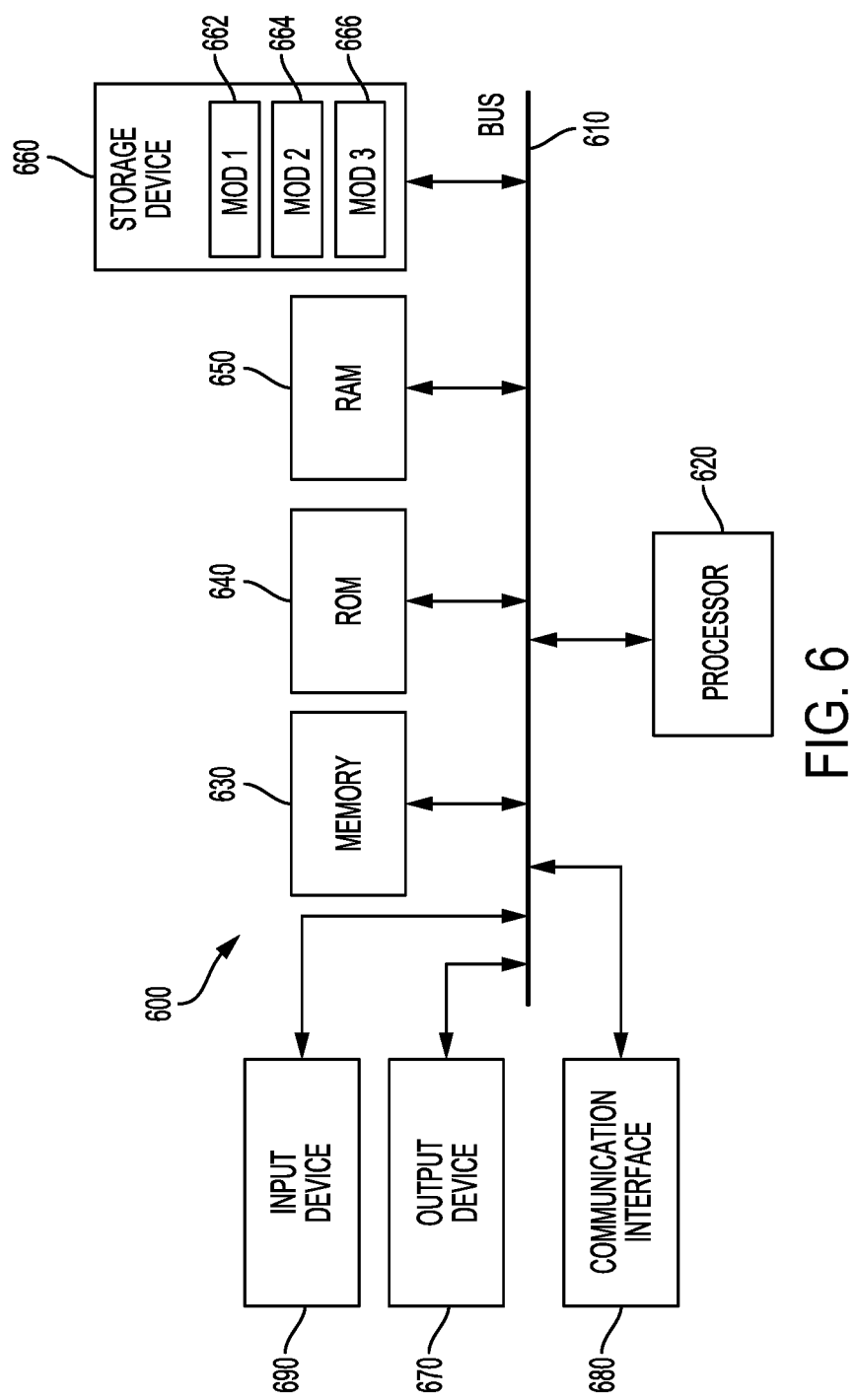
FIG. 6 illustrates an exemplary computer system.

With reference to FIG. 6, an exemplary system includes a general-purpose computing device 600, including a processing unit (CPU or processor) 620 and a system bus 610 that couples various system components including the system memory 630 such as read-only memory (ROM) 640 and random access memory (RAM) 650 to the processor 620. The system 600 can include a cache of high-speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
   identifying, via a processor, a plurality of causes for a vehicle to record data on a blockchain, wherein one cause in the plurality of causes is a repetition of a previous journey;
   generating route comparison data by comparing, via the processor as the vehicle is moving, current journey data for a current journey to previous journey data of at least one previous journey by:
      comparing a current journey start time to a previous journey start time;
      comparing a current journey travel time to a previous journey travel time; and
      comparing current journey route coordinates to previous journey route coordinates;
   identifying, via the processor based on the route comparison data, that the vehicle is performing the current journey which is a repeat of the previous journey, wherein statistics associated with the previous journey were previously recorded in the blockchain;

identifying a previous block within the blockchain which contains the statistics for the previous journey;

generating, via the processor a side block, the side block having a data structure compatible with addition to the blockchain, the side block comprising:
 a reference to the previous block; and
 data about the current journey which is distinct from the previous journey; and adding the side block to the blockchain.

2. The method of claim 1, wherein the previous block comprises:
 a drive time for the previous journey;
 fuel consumption for the previous journey;
 weight of freight carried on the previous journey; and
 at least one of acceleration and deceleration data.

3. The method of claim 1, wherein adding the side block to the blockchain is part of a distributed verification process.

4. The method of claim 1, wherein the side block is added to the blockchain upon completion of the current journey.

5. The method of claim 1, wherein the blockchain also comprises blocks generated by weigh stations.

6. The method of claim 1, further comprising adding, to the blockchain, vehicle data, the vehicle data comprising at least one of fluid levels, engine data, tire mileage, total mileage of the vehicle, and time since wiper replacement.

7. The method of claim 1, further comprising:
 identifying, via the processor, a plurality of times to record the data on the blockchain, the plurality of times corresponding to the plurality of causes such that for each cause a corresponding time in the plurality of times indicates when to record the data on the blockchain.

8. A system comprising:
 a processor; and
 a computer-readable storage medium having instructions stored which, when executed by the processor, cause the processor to perform operations comprising:
  identifying a plurality of causes for a vehicle to record data on a blockchain, wherein one cause in the plurality of causes is a repetition of a previous journey;
  generating route comparison data by comparing, as the vehicle is moving, current journey data for a current journey to previous journey data of at least one previous journey by:
   comparing a current journey start time to a previous journey start time;
   comparing a current journey travel time to a previous journey travel time; and
   comparing current journey route coordinates to previous journey route coordinates;
  identifying, based on the route comparison data, that the vehicle is performing the current journey which is a repeat of the previous journey, wherein statistics associated with the previous journey were previously recorded in the blockchain;
  identifying a previous block within the blockchain which contains the statistics for the previous journey;
  generating a side block, the side block having a data structure compatible with addition to the blockchain, the side block comprising:
   a reference to the previous block; and
   data about the current journey which is distinct from the previous journey; and
  adding the side block to the blockchain.

9. The system of claim 8, wherein the previous block comprises:
 a drive time for the previous journey;
 fuel consumption for the previous journey;
 weight of freight carried on the previous journey; and
 at least one of acceleration and deceleration data.

10. The system of claim 8, wherein adding the side block to the blockchain is part of a distributed verification process.

11. The system of claim 8, wherein the side block is added to the blockchain upon completion of the current journey.

12. The system of claim 8, wherein the blockchain also comprises blocks generated by weigh stations.

13. The system of claim 8, the computer-readable storage medium having additional instructions stored which, when executed by the processor, cause the processor to perform additional operations comprising:
 adding, to the blockchain, vehicle data, the vehicle data comprising at least one of fluid levels, engine data, tire mileage, total mileage of the vehicle, and time since wiper replacement.

14. The system of claim 8, the computer-readable storage medium having additional instructions stored which, when executed by the processor, cause the processor to perform additional operations comprising:
 identifying a plurality of times to record the data on the blockchain, the plurality of times corresponding to the plurality of causes such that for each cause a corresponding time in the plurality of times indicates when to record the data on the blockchain.

15. A non-transitory computer-readable storage medium having instructions stored which, when executed by a computing device, cause the computing device to perform operations comprising:
 identifying a plurality of causes for a vehicle to record data on a blockchain, wherein one cause in the plurality of causes is a repetition of a previous journey;
 generating route comparison data by comparing, as the vehicle is moving, current journey data for a current journey to previous journey data of at least one previous journey by:
  comparing a current journey start time to a previous journey start time;
  comparing a current journey travel time to a previous journey travel time; and
  comparing current journey route coordinates to previous journey route coordinates;
 identifying, based on the route comparison data, that the vehicle is performing the current journey which is a repeat of the previous journey, wherein statistics associated with the previous journey were previously recorded in the blockchain;
 identifying a previous block within the blockchain which contains the statistics for the previous journey;
 generating a side block, the side block having a data structure compatible with addition to the blockchain, the side block comprising:
  a reference to the previous block; and
  data about the current journey which is distinct from the previous journey; and
 adding the side block to the blockchain.

16. The non-transitory computer-readable storage medium of claim 15, wherein the previous block comprises:
 a drive time for the previous journey;
 fuel consumption for the previous journey;
 weight of freight carried on the previous journey; and
 at least one of acceleration and deceleration data.

17. The non-transitory computer-readable storage medium of claim 15, wherein adding the side block to the blockchain is part of a distributed verification process.

18. The non-transitory computer-readable storage medium of claim 15, wherein the side block is added to the blockchain upon completion of the current journey.

19. The non-transitory computer-readable storage medium of claim 15, wherein the blockchain also comprises blocks generated by weigh stations.

20. The non-transitory computer-readable storage medium of claim 15, having additional instructions stored which, when executed by the computing device, cause the computing device to perform additional operations comprising:
   adding, to the blockchain, vehicle data, the vehicle data comprising at least one of fluid levels, engine data, tire mileage, total mileage of the vehicle, and time since wiper replacement.

\* \* \* \* \*